Patented Apr. 18, 1950

2,504,200

UNITED STATES PATENT OFFICE 2,504,200

CORROSION INHIBITING COMPOSITIONS

Sven Christian Johansson, Goteborg, Sweden

No Drawing. Application May 7, 1946, Serial No. 668,010. In Sweden May 12, 1945

9 Claims. (Cl. 106—14)

This invention relates to lubricants, coating materials such as paints, varnishes, lacs and to disinfectants and like products, the object of the invention being to produce compositions of these kinds which will be of non-corrosive character. To this end said products are mixed with an aromatic hydroxycarboxylic acid with one or more nitro groups, or a compound in which the hydrogen of the carboxyl and/or hydroxyl groups of said acid is replaced by metal, ammonium, radical of organic base or other organic compound. The aromatic hydroxy-carboxylic acid may contain one or more carboxyl and hydroxyl groups. As examples the following acids may be mentioned: Mononitrohydroxybenzoic acid, dinitrohydroxybenzoic acid, mononitrohydroxyphthalic acid, dinitrohydroxyphthalic acid and homologues of these acids. The compounds here referred to exert their corrosion inhibiting action either as such or in more or less neutralized condition. I prefer, however, to use them in the form of salts or esters or compounds which are both salts and esters. Thus, either the hydrogen of the hydroxyl groups only or the hydrogen of the carboxyl groups only or the hydrogen of hydroxyl as well as carboxyl groups may be replaced by metal or organic radical. Of the metals, for example, the alkali metals and alkaline earth metals may be employed and of the former lithium has proved to be specially suitable in certain respects. The organic radicals may comprise amine radicals, alkyl, phenyl groups etc.

As examples of compounds, that have been tested and proved to have very good rust protecting properties, the following compounds of dinitroparahydroxybenzoic acid may be mentioned. $HOOC.C_6H_2.(NO_2)_2.OLi$, $LiOOC.C_6H_2.(NO_2)_2.OLi$ and $CH_3.OOC.C_6H_2.(NO_2)_2.OLi$. The corresponding compounds of mononitroparahydroxybenzoic acid have also proved to be suitable for the purpose in question. Also the homologues of these compounds are useful for the same purpose. In the examples stated the oxy group is in para position to the carboxyl group but corresponding compounds of the oxy group in ortho or meta position may also be used.

The position of the nitro group or groups is of a certain importance since it is or they are most effective in ortho position to the oxy group. But compounds with the nitro groups in other positions are not excluded as nitrocompounds to be added to the products here referred to.

So low concentration as 1 part of weight of any of the compounds of nitroparahydroxybenzoic acid in 500,000 parts of weight of water prevents during a considerable time corrosion of ordinary iron and steel.

When the corrosion inhibiting agents mentioned are to be added to lubricant oils, coating oils or fuel oils, in which said agents are not directly soluble, they before the addition have to be dissolved in an organic solvent soluble in the oil, and for that reason their solubility in such solvents is of importance.

The lithium salt of mononitro-p-hydroxybenzoic acid is, for example, soluble in alcohol in the proportion 1:125 and in ethylacetate in proportion 1:80. The lithium salt of dinitro-p-hydroxybenzoic acid is soluble in alcohol in the proportion 1:10,000. The lithium salt of mononitro-p-hydroxybenzoic acid-ethylester is soluble in alcohol in the proportion 1:110, in amylalcohol in the proportion 1:150 and in ethylacetate in the proportion 1:310. Nitro-p-hydroxybenzoic acid and esters thereof are soluble in alcohol.

Since the compounds above mentioned are corrosion inhibiting also in very low concentrations, it will be evident that they may be dissolved in sufficient quantities in oils of different kinds, such as lubricant, coating and fuel oils, to prevent corrosion by these oils.

At least the alkali compounds of the nitrohydroxybenzoic acids above mentioned are soluble in water so that they without any difficulty in sufficient quantities may be dissolved in coating materials containing water. Thus, these corrosion inhibiting agents may be dissolved in coating materials with a high percentage of water such as cement paints, size, casein and water glass paints. Dissolved in organic solvents the corrosion inhibiting agents may be mixed with lacquers and varnishes of different types made, for example, of resin, cellulose nitrate and cellulose acetate and other cellulose derivatives. The corrosion inhibiting agent may also in solid form be supplied to the coating material, and in this case also such nitrooxy compounds of the type stated may be used as are difficultly soluble in common organic solvents such as amylalcohol and other alcohols. It is, of course, a necessary condition that the corrosion inhibiting compounds have a certain, if also very slight, solubility in water for otherwise their corrosion preventing properties cannot be effective.

Disinfectants for medical, surgical or other usage are also a class of substances which may be made non-corrosive by the compounds here referred to. In the cases tested these compounds have no injurious effect on the disinfectants but they rather improve the sterilizing properties. In the use of ordinary corroding disinfectants a certain dissolution of metal out of the metal article to be sterilized takes place and it is a peril that the metal dissolved will influence the composition of the disinfectant in an injurious way. Thus, in addition to preventing corrosion the nitrooxy compounds referred to will keep the disinfectants in unchanged condition. Only as an example it may be mentioned that an aqueous solution of 5% of the antiseptic agent chloramine with the lithium salt of dinitrohydroxybenzoic acid with the concentration 1:2,000 will in 48 hours not exert any corrosion on iron and steel.

The corrosion test has been made with ordinary steel. The corrosion rate depends, of course, not only on the composition of the solution but also on other factors such as temperature, sort of steel, admission of air, the material of the vessel employed for the solution, etc.

In the above description only the disinfectant chloramine has been mentioned. But also other disinfectants may be made non-corrosive by the addition of a slight quantity of the nitrooxy compounds above mentioned. As such disinfectants may be mentioned: hypochlorites (e. g. sodium hypochlorite, chlorite of lime), hydrogen peroxide, iodine (e. g. iodine dissolved in alcohol), bromine, iodine compounds and bromine compounds, such as iodoform and bromoform, sublimate and other mercury compounds such as mercurochrome or phenylmercury salts, disinfectants containing formalin, e. g. mixtures of formalin and alcohol, formaldehyde-soap-solutions, phenol, cresol, thymol, naphthol, certain alkyl and acyl resorcinols, benzoic acid, esters thereof and homologues, acridine derivatives, diamidines, etc.

The disinfectant constituent and the corrosion inhibiting constituent or constituents may be mixed with each other in the form of a molecular or colloidal solution, dispersion or emulsion. The constituents may, of course, if possible and desired, be mixed with each other in solid form in suitable proportions, e. g. as powder or tablets.

What I claim is:

1. A corrosion resisting coating composition drying, on application, to a solid surface and comprising the coating ingredients which thus dry and a small amount of a corrosion inhibiting agent sufficient to inhibit corrosion under at least atmospheric conditions and having the general formula

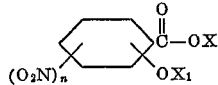

wherein each of $X$ and $X_1$ is a member of the class consisting of hydrogen, the methyl group, the ammonium radical, and the alkali and alkaline earth metals, and $X_1$ is linked to a ring carbon free of linkages to any other substituent group, and $n$ is 1 or 2.

2. A coating composition as claimed in claim 1, wherein a nitro group is in ortho position to the group $X_1$.

3. A coating composition as claimed in claim 1, wherein the substituent group $OX_1$ is in para position to the carbonyl containing substituent.

4. A coating composition as claimed in claim 3, wherein a nitro group is in ortho position to the group $X_1$.

5. A coating composition as claimed in claim 4, wherein $n$ is two.

6. A coating composition as claimed in claim 5, wherein $X_1$ is lithium.

7. A coating composition as claimed in claim 6, wherein $X$ is hydrogen.

8. A coating composition as claimed in claim 6, wherein $X$ is the methyl group.

9. A coating composition as claimed in claim 6, wherein $X$ is lithium.

SVEN CHRISTIAN JOHANSSON.

REFERENCES CITED

The following references are of record in the file of this patent:

UNITED STATES PATENTS

| Number | Name | Date |
| --- | --- | --- |
| 2,334,158 | Fuchs et al. | Nov. 9, 1943 |
| 2,349,044 | Jahn | May 16, 1944 |
| 2,366,074 | Wasson et al. | Dec. 26, 1944 |